Figure 1:
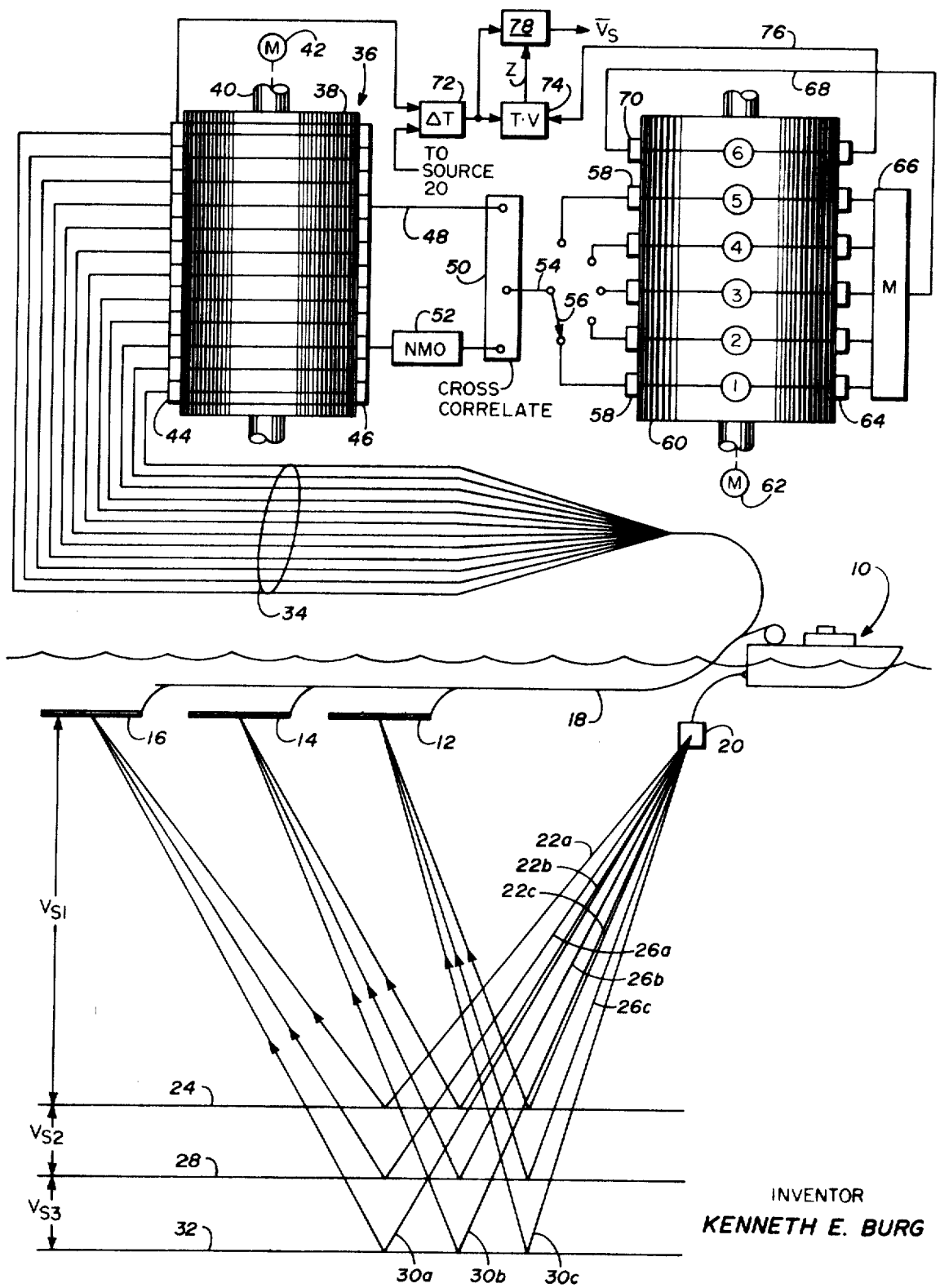

United States Patent

Burg

[15] 3,644,882
[45] Feb. 22, 1972

[54] MARINE ACOUSTIC VELOCITY PROFILING

[72] Inventor: Kenneth E. Burg, Dallas, Tex.

[73] Assignee: Texas Instruments Incorporated, Dallas, Tex.

[22] Filed: Aug. 28, 1969

[21] Appl. No.: 853,646

[52] U.S. Cl. ............................................. 340/7, 340/15.5
[51] Int. Cl. ................................................. G01v 1/28
[58] Field of Search .................................... 340/15.5, 7

[56] References Cited

UNITED STATES PATENTS

| | | | |
|---|---|---|---|
| 3,274,541 | 9/1966 | Embree | 340/15.5 |
| 3,284,763 | 11/1966 | Burg et al. | 340/15.5 |
| 3,292,141 | 12/1966 | Hines et al. | 340/7 |
| 3,300,754 | 1/1967 | Lee et al. | 340/15.5 |
| 3,317,890 | 5/1967 | Hensley, Jr. | 340/7 |
| 3,409,871 | 11/1968 | Heffring | 340/15.5 |
| 3,417,370 | 12/1968 | Brey | 340/15.5 |

Primary Examiner—Rodney D. Bennett, Jr.
Assistant Examiner—N. Moskowitz
Attorney—James O. Dixon, Andrew M. Hassell, Harold Levine, Rene E. Grossman and Melvin Sharp

[57] ABSTRACT

A marine vessel streams a plurality of hydrophones while sequentially generating acoustic waves along a marine traverse at spaced-apart intervals to provide common depth point coverage of reflecting horizons within the water layer. The hydrophones receive reflections from the water layer to generate signals which are then recorded. Cross-correlations are taken of selected gates of the signals, the gates being related to one another in dependence upon the horizontal spacing between ones of the hydrophones. Acoustic velocity is the variable in the cross-correlations. The cross-correlation products are summed to produce a composite velocity correlation function, the peak point of which provides an indication of the acoustic velocity of the underwater section through which the reflections of the acoustic waves travel. Arithmetic operations are performed on the acoustic velocities to provide a substantially real-time profile of the acoustic velocity of the intervals between the underwater reflecting horizons.

6 Claims, 3 Drawing Figures

INVENTOR
KENNETH E. BURG

MARINE ACOUSTIC VELOCITY PROFILING

This invention relates to velocity profiling, and more particularly to the substantially real-time determination of velocity profiles of underwater masses by nonlinear cross-correlation between signal gates or acoustic reflection recordings, wherein the correlation variable is velocity.

It is desirable for a number of applications to accurately determine the velocity of sound propagation through the various acoustic layers in a water mass and in the sea floor and shallow sediments just below the water floor. For instance, it is possible to ascertain the travel path, and the direction and distance of travel of each ray or segment of wave front radiated from an acoustic source, if the velocity of each acoustic layer in the water and sediment mass is known.

Large water masses such as the oceans are composed of an extremely large number of thin layers each having a velocity differing from the adjacent layer by a small amount. It has, however, been found that it is possible to group these thin layers into zones whose overall average velocity is a composite of the individual thin layer velocities. The predicted propagation path and overall travel time of an acoustic wave through these zones will vary by an insignificant amount from the actual observed path and travel time of the acoustic wave.

It is known that the velocity of sound in sea water is a function of temperature, depth and salinity. Thus, it has heretofore been known to determine the velocity of a salt water mass by measuring the temperature at predetermined depths by means of a thermometer and also ascertaining the salinity from a sample of water obtained at the same depth. A more modern technique is to use a device commonly termed a "sing-around" velocimeter, such as the velocimeter disclosed in *Review of Scientific Instruments*, November, 1947, Volume 28, No. 11, pages 897–901, by Greenspan et al. Such "sing-around" velocimeters provide a continuous measure of the acoustic velocity of each small layer of the water traversed as the velocimeter is lowered or raised through the water mass.

While prior techniques have provided reasonably satisfactory results in determining the velocity of water at a specific point of measurement, the velocity data thus collected is only applicable at the point of measurement, and the measurements must be taken in a time-consuming vertical point-to-point manner. Because of the point-to-point, widely spaced apart discrete measurements resulting from prior techniques, velocity-depth profiles heretofore ascertained have often failed to accurately acoustically describe water layers. For example, the emperical grouping of spaced-apart discrete velocity measurements into significant acoustic zones have been found to introduce serious discrepancies between the computed and actual propagation paths of acoustic signals.

Also, prior velocity measurements have generally been widely spaced apart in a horizontal plane, thus causing discrepancies and errors when the water mass is emperically broken down into arbitrarily chosen velocity layers in dependence upon the widely separated measurement points. Prior point-to-point velocity measurements have been extremely time consuming. It has been found that acoustic layering changes daily in the ocean mass in an unpredictable manner, and thus such discrete measurements taken over a period of time provide additional ambiguities into the final acoustic profile. Further, with prior art velocity techniques, the velocity-relationships are obtained only after a laborious process in interpretation of the data. Thus, final results are not available until days and weeks after the collection of the velocity data.

In accordance with the present invention, a method and apparatus is provided for continuously and accurately dividing an underwater mass into significant acoustic layers and determining the velocity of each layer in a substantially real-time manner. In the present invention, generally instantaneous determination is provided for significant velocity data along a continuous horizontal traverse, thus eliminating the majority of the problems encountered in prior art techniques, and resulting in immediately available velocity profiling for use in development of ocean resources, national defense and the like.

In accordance with the invention, acoustic waves are sequentially generated along a marine traverse. Signals are generated in response to detection of reflections of the waves at a plurality of detecting locations along the marine traverse. Indications of the acoustic velocity between underwater reflecting horizons are then generated in response to cross-correlation of selected portions of the signals.

In accordance with a more specific aspect of the invention, acoustic waves are sequentially generated along a marine traverse at spaced intervals such that common depth point coverage is provided of reflecting horizons within the water layer. Reflections of the acoustic waves from the reflecting horizons are received at a plurality of locations in order to produce signals. Signal gates of selected ones of the signals are cross-correlated wherein acoustic velocity is the correlation variable. Composite velocity correlation functions are produced in response to the cross-correlation products, the peak positive point of the composite functions providing indications of the average velocities of the water masses through which the acoustic waves have traveled. From the average velocities, the sectional velocity of the intervals between the underwater reflecting horizons is determined on a substantially real-time basis.

Figures 2, 3:
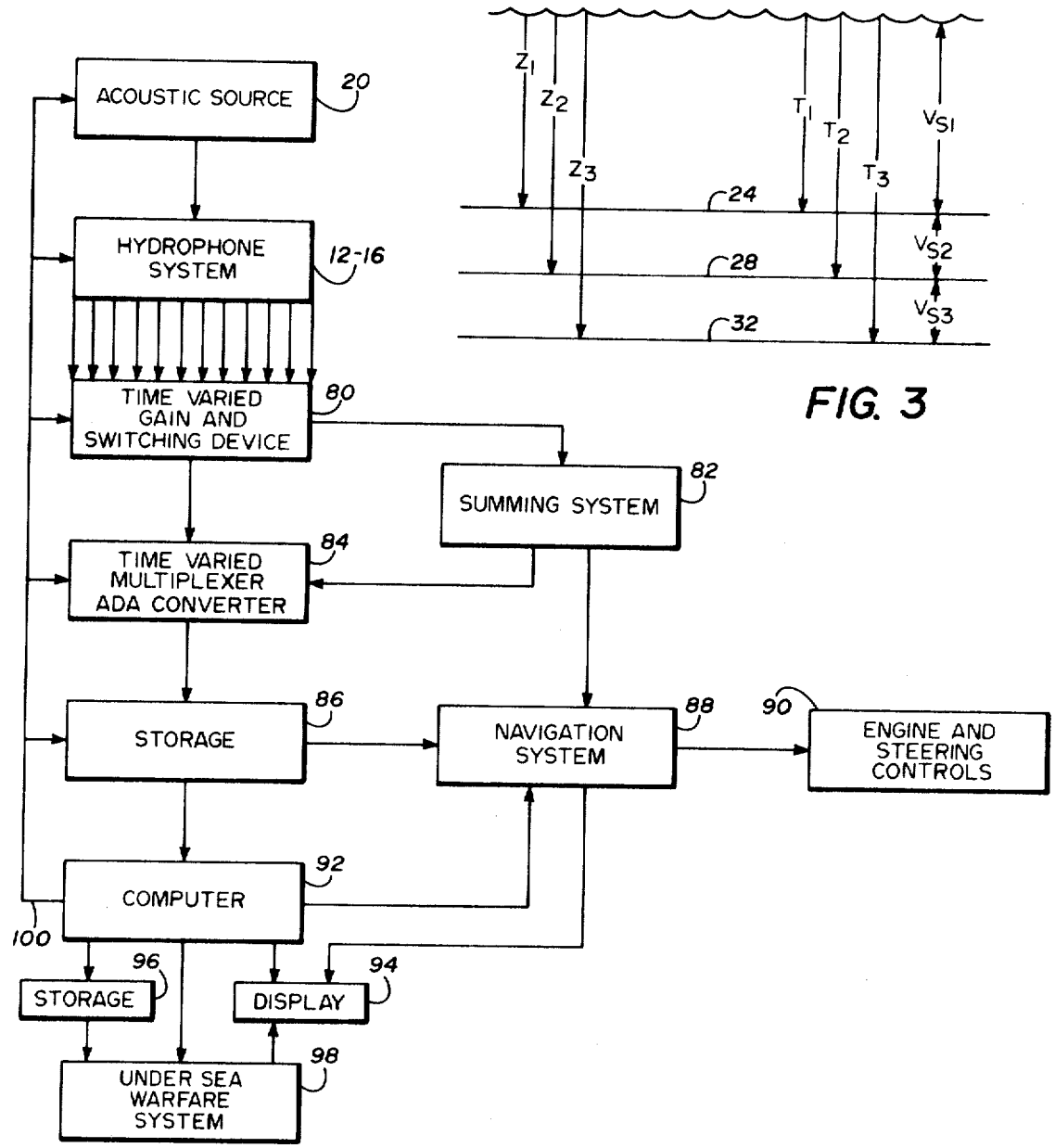

For a more complete understanding of the present invention and for further objects and advantages thereof, reference is now made to the following description taken in conjunction with the accompanying drawings, in which:

FIG. 1 somewhat diagrammatically illustrates an embodiment of the invention;

FIG. 2 is a block diagram of the component parts of the preferred embodiment of the invention; and FIG. 3 is a diagrammatic illustration of the depths and travel times utilized by the invention.

Referring to FIG. 1, a marine vessel 10 is illustrated as streaming three hydrophone detector systems 12, 14 and 16 along a marine traverse by means of the cable 18. The hydrophone detector systems 12–16 may comprise any suitable type conventionally used, as for example, the systems disclosed in U.S. Pat. No. 3,386,526, issued June 4, 1968 to Kenneth E. Burg. While three hydrophone detector systems have been illustrated, it will be understood that more or less systems may be utilized to provide different desired operating characteristics. The marine vessel 10 also tows therebehind an acoustic wave source 20. Source 20 may comprise any one of a number of conventional acoustic wave sources, such as an air gun, a gas explosion device, dynamite shots or an acoustical radiating antenna such as disclosed in U.S. Pat. No. 3,334,328, issued to Kenneth E. Burg et al.

Source 20 is sequentially energized during a marine traverse from vessel 10 to generate acoustical waves which travel downwardly and which are reflected upwardly for reception by the hydrophone detector systems 12, 14 and 16. For instance, certain of the acoustic waves travel raypaths $22a$–$c$ and are reflected upwardly from water horizon or interface 24. As is well known, the angle of incidence of the acoustic waves is equal to the angle of reflection. The average velocity of the water interval between the water surface and the interface 24 is designated as $V_1$.

In a similar manner, acoustic wave energy passes through the interface 24 and is reflected via raypaths $26a$–$c$ from a water interface 28 for reception by the hydrophone detector systems. Acoustic energy also travels the deeper raypaths $30a$–$c$ for reflection from the interface 32. Interface 32 may comprise a water-reflecting horizon interface, or may comprise the sea floor or shallow sediments just below the sea floor. The average acoustic velocity between the water surface and interface 28 is designated as $V_2$, while the average sectional acoustic velocity between the interfaces 24 and 28 is designated as $V_{s2}$. The average acoustic velocity between the water surface and interface 32 is denoted as $V_3$, with the average sectional acoustic velocity between interfaces 28 and 32 being designated as $V_{s3}$. The depths $Z_1$–$Z_3$ and travel times $T_1$–$T_3$ of the acoustic waves for reflecting horizons 24, 28, and 32 are illustrated in FIG. 3.

The acoustic wave source 20 is sequentially energized along the marine traverse at time intervals related to the time consumed by the vessel 10 in traveling a distance equal to one-half the distance between the hydrophone detector systems 12, 14 and 16. The effect of this synchronization of the source 20 with the distance of travel of the vessel 10 is to superimpose the reflection points at each underwater reflecting horizon for progressively greater distances between the source 20 and the receiving hydrophone detector. This technique is commonly termed "common depth point coverage," and is disclosed in a number of publications including *Geophysics*, Volume XXVII, No. 6, Part ii, Dec. 1962, by W. Harry Mayne; in U.S. Pat. No. 2,732,906, issued Jan. 31, 1956 to W. Harry Mayne, and U.S. Pat. No. 3,217,828, issued Nov. 16, 1965 to Mendenhall et al. As will be later described, the common depth point coverage according to the invention eliminates the introduction of ambiguities into the determination of velocity because of dip angle of underwater interfaces.

Upon detecting reflections of acoustic waves generated by the source 20, the hydrophone detector systems 12–16 generate electrical signals which are fed through conductors in the cable 18 and through a plurality of individual conductors 34 to a recording system 36. The recording system 36 may comprise any suitable type of electrical signal recorder, such as a magnetic drum 38 mounted on a shaft 40 and driven by a motor 42. A plurality of recording heads 44 store the electrical signals as separate acoustic data traces on the drum 38. The stored signals may be reproduced by playback heads 46. The acoustic data traces may be stored on drum 38 in analog form. Alternatively, the traces may be sampled and recorded on magnetic tape as a conventional digital acoustic record in the manner described in U.S. Pat. No. 3,134,957 issued to Foote et al.

The acoustic signal recorded on a selected one of the traces is applied via a channel 48 to one input of a correlation system 50. A signal from another selected trace on the drum 38 is applied through a normal moveout unit 52 to another input of the correlation system 50. A correlation system output is applied via a conductor 54 through a switch arm 56 to any one of a plurality of recording heads 58 on a multitrack recording drum 60. Drum 60 is driven by a motor 62. Switch arm 56 may be selectively actuated to apply the correlation signal output to any one of the traces 1–5 on drum 60. Playback heads 64 connect the traces 1–5 on the drum to a summation unit 66, the output of which is applied via a conductor 68 to a recording head 70, so that the summation signal may be stored upon the drum 60.

Selected ones of the outputs from the recording heads 44 are fed into an input of a time interval detector circuit 72, along with indications of the time of energization of source 20. Circuit 72 detects the time interval between the generation of acoustic waves from source 20 to the reception of the waves at the hydrophone detector systems. Circuit 72 then divides the detected time interval to generate indications of the travel time of an acoustic wave down to selected water interfaces. Circuit 72 may comprise, for instance, a bistable multivibrator circuit with suitable output voltage divider circuitry.

The output from circuit 72 is fed to a multiplier 74, which multiplies the travel time by the average velocity of a selected water mass which is fed from playback head 64 via lead 76. As will be later described, the output from multiplier 74 is representative of the depth to the selected interface. The time and depth signals for selected interfaces are fed to operational circuit 78, which may comprise a special purpose computer. Circuit 78 generates indications of the average sectional acoustic velocity which may be recorded on any suitable display or profiler.

The cross-correlation portion of the processing system thus described is more fully disclosed in U.S. Pat. No. 3,417,370, issued to Brey on Dec. 17, 1968. The Brey patent discloses the operation of the processing system to determine the average acoustic velocity from an acoustic source to a reflection point. The disclosure of the system and operation contained within the Brey patent is hereby incorporated herein. Basically, the Brey patent determines acoustic velocity by utilizing unique properties which permit corrections for normal moveout. More specifically, the velocity down to a selected reflector is obtained by utilizing two related reflection traces from the reflector by effectively correcting one of the traces for normal moveout over a given signal gate which includes a reflection from the selected reflector. This normal moveout correction is based upon each of a plurality of different selected velocities.

The corrected data gate is cross-correlated with the uncorrected second trace having a different geometry, wherein the variable in the cross-correlation is velocity. The resultant cross-correlation function will have a positive maximum peak which is representative of the actual velocity through which the reflection has passed. This operation is carried out for each of a plurality of pairs of the acoustic data traces and for each of a plurality of time gates located at successively increasing record times. The velocity correlation functions of the different pairs of the traces are summed, as by stacking, to provide high resolution.

Referring to FIG. 1, a window or signal gate is taken on one of the traces recorded on the drum 38 and the normal moveout correction unit 52 shifts the events within the signal gate nonlinearly in the well known normal moveout correction manner. The nonlinearly shifted signal gate is then cross-correlated with zero time delay and the cross-correlation system 50 with a signal gate from the trace sensed by the conductor 48. The amplitude from this cross-correlation is then registered or stored on track 1 of the drum 60.

Drum 60 may be rotated or moved under control of the stepping motor 60 for incrementing the drum relative to the recording heads 58 for each selected normal moveout cycle. Each of the traces stored on the drum 38 have time gates thereof which are corrected for normal moveout for a given velocity, or cross-correlated with an appropriate time gate from the reference signal trace, and then recorded on subsequent channels on the drum 60. The cross-correlation products are then summed by the summing circuit 66 and recorded by the recording head 70. More specifically, the present method is accomplished by taking a velocity correlation between any and all pairs of traces $f(t)$ and $g(t)$ on the acoustic reflection recording a velocity correlation is obtained $$\alpha(V_j^i) = T_c = \sum_{t_0}^{t_{max}} f(T_c) \cdot g(T_i) \qquad (1)$$

where $$T_i = T_c - \sqrt{\frac{2T_c (X_i - X_c) \cos p}{V_j} + \frac{(X_i - X_c)^2}{V_j^2}} \qquad (2)$$

and $$\cos p = -\left\{ \cos \alpha \left( \frac{X_c \cos \alpha}{V_j T_c} \right) + \sin \alpha \sqrt{1 - \left( \frac{X_c \cos \alpha}{V_j T_c} \right)^2} \right\} \qquad (3)$$

and $T_c$ = wave arrival time to reference hydrophone,
$V_j = V_0 - V_{max}$ in $\Delta v$ increments,
$G_o$ = initial gate time on trace $f$,
$G_{max}$ = final gate time on trace $f$,
$\alpha$ = dip angle
$X_c$ = horizontal offset from shot to hydrophone $c$, and
$X_i$ = horizontal offset from shot to hydrophone $i$, as $\alpha$ ≠ 0.

N correlations from the N pairs of traces preferably are then stacked or summed to produce a composite correlation function:

$$\psi(V_j) = \sum_{n=1}^{N} \alpha(V_j) \qquad (4)$$

Average velocity $V$ is then chosen as the $V_j$ which results in the maximum positive value of $(V_j)$. It should be noted here that the velocity correlations which are stacked to form the function $\psi(V_j)$ are not limited to all being from the same record. A spatial average from more than one record will tend to reduce the effect of noise and near surface static effects on the velocity determination.

The foregoing steps are repeated at successive time intervals on the record(s) producing a set of average velocities $V_k$ as a function of record time. However, for use in collecting for normal moveout, $V$ must be known as a function of vertical raypath travel time rather than record time. The maximum amplitude on the correlation function of equation 4 will not be representative of a vertical path. However, record time $T_i$ can be expressed as a function of vertical travel time $T_v$.

$$T_i^2 = T_{v2} + \frac{2X_i T_v \sin \alpha}{V} + \frac{X_{i2}}{V^2} \quad (5)$$

Again as $\alpha \rightarrow 0$, $$T_i^2 \rightarrow T_v^2 + \frac{X_{i2}}{V^2}$$

wherein $T_v$ = vertical travel time to the selected reflector.

In any case for single fold operations the dip angle ($\alpha$) is assumed to be known and $V$ is determined as outlined above. The $T_i$'s are made up from the gate centers, i.e., $$\frac{G_{\max} + G_0}{2}$$

as specified for the $c$th offset traces $[f(t)]$ in the above $N$ velocity correlations and also from the moveout times corresponding to these gate centers as determined by using $V$ for the $i$th offset traces $[g(t)]$ in the $N$ velocity correlations. Thus, from the $N$ velocity correlations which produce $\psi(V_j)$, there are $2N$ $T_i$'s determined, some of which are redundant if the same trace is used more than once in the N correlations.

It remains to solve equation 5 for $T_v$ and this may be done by known methods including the method of at least squares with the known constraints on $V$ and $\alpha$.

$$T_{v1} = \frac{\sqrt{\left(K_1 \sum_{i=1}^{2N} X_{i_2}\right)^2 - \sum_{i=1}^{2N} X_i A_1 \sum_{i=1}^{2N} X_{i2} - \sum_{i=1}^{2N} X_i T_{i_2}}}{\sum_{i=1}^{2N} X_i} \quad (6)$$

where $$K_1 = \frac{\sin \alpha}{V_1} \cdot A_1 = \frac{1}{V_{i2}}$$

In the special case where $\alpha = 0$, $$T_{v1} = \frac{1}{\sqrt{2N}} \sqrt{\sum_{i=1}^{2N} T_{i2} - A_1 \sum_{i=1}^{2N} X_{i2}} \quad (7)$$

The use of the common depth point coverage of the invention eliminates any required knowledge of the dip angle $\alpha$. In accordance with the invention, after the average velocity from the water surface to the first reflector 24 is determined, later time gates are taken of the recorded acoustic signals in order to determine the average velocity of the water mass from the water's surface to lower water-reflecting horizons such as 28 and 32. The same step of correcting these time gates for normal moveout, cross-correlating and summing the cross-correlation functions for each of a plurality of assumed velocities will be then carried out for these later time gates. Thus, the average velocities $V_1$, $V_2$ and $V_3$ are determined by the invention.

An important aspect of the invention is the determination of the average sectional velocity $V_{s2}$ between the reflecting horizons 24 and 28 and the determination of the average sectional velocity $V_{s3}$ between the reflecting horizons 28 and 32. This is accomplished by the circuits 72-78 according to the following equations:

$$Z_1 = T_1 V_1$$
$$Z_2 = T_2 V_2 \quad (8)$$
$$Z_3 = T_3 V_3$$

wherein, according to FIG. 3, $Z_1$ = depth to reflecting horizon 24
$Z_2$ = depth to reflecting horizon 28
$Z_3$ = depth to reflecting horizon 32
$T_1$ = travel time of acoustic wave to interface 24
$T_2$ = travel time of acoustic wave to interface 28
$T_3$ = travel time of acoustic wave to interface 32 $V_1$, $V_2$ and $V_3$ being previously defined.

Hence, $$V_{s_1} = V_1 = \frac{Z_1}{T_1}.$$

$$V_{s_2} = \frac{Z_2 - Z_1}{T_2 - T_1}.$$

$$V_{s_3} = \frac{Z_3 - Z_2}{T_3 - T_2}.$$

$V_{s_1}$, $V_{s_2}$ and $V_{s_3}$ being the average sectional velocities as previously defined.

While only three reflecting water interfaces have been used for description purposes, it will be understood that the invention will be utilized to compute a large number of such average velocities for great depths.

Although the invention has been described with respect to operation of the system shown in FIG. 1, where acoustic data is recorded in the digital manner disclosed in the Foote et al. U.S. Pat. No. 3,134,957, normal moveout correction operations may be advantageously carried out by use of a digital computer. When the invention is accomplished digitally, the system shown in FIG. 2 will be preferred. The acoustic source 20 and the hydrophone systems 12-16 are illustrated in block form, with a plurality of reflection signals being fed from the hydrophone system into a time-varied gain and switching device 80.

Device 80 may comprise any suitable conventional gain control amplifying system, such as for example, the field system sold under the trade name DFS/10,000 manufactured and sold by Texas Instruments Incorporated, or the system identified as PT100 and sold by the SIE Division of Dresser Electronics. Such gain control compensates for variations of signal level caused by the variations in the overall travel time to the various acoustic interfaces, in the well-known manner. A switch (not shown) is disposed in each of the output channels of the hydrophone systems in order to enable selective samplings of the output from any one of the hydrophones. As will be later described in more detail, such sampling is required in order to operate upon reflections from both shallow and deep reflecting horizons.

The gain-conditioned analog signals from the device 80 are fed to a summing system 82 and also to a time-varied multiplexer and analog-to-digital converter 84. The multiplexer and converter 84 may comprise for instance the system disclosed in the Foote et al., U.S. Pat. No. 3,134,957.

A digital output from the converter 84 is fed to a storage unit 86, which may comprise any suitable magnetic disc or tape storage. Stored digital data may be fed to an input of the navigation system 88 which controls the operation of the engine and steering controls 90 of the vessel 10. The stored data is fed to the computer 92, which may comprise for instance, a properly programmed TIAC computer manufactured and sold by Texas Instruments Incorporated, or a CDC3600 computer. The normal moveout correction and cross-correlation previously described is conducted within the computer 92.

Such cross-correlation of digital signals is well known and is described in a number of publications. For instance, U.S. Pat. No. 3,075,607, issued Jan. 29, 1963, to Aitken et al., and assigned to the present assignee, describes digital cross-correlation in detail. Other descriptions of typical cross-correlation techniques may be found in Geophysics, Volume 33, No. 1 Feb. 1968), page 105-126, by Schneider et al; and in the copending patent application Ser. No. 550,314, entitled "Space Averaged Dynamic Correlation Analysis," by Backus et al.

The velocity profile information determined by the computer 92 is fed to a suitable display 94 to provide substantially real-time velocity profile information. For instance, the display 94 may comprise an X-Y plotter, a cathode-ray tube or the like. Additionally, the velocity profile information is stored in a storage media 96 for application to peripheral systems such as an undersea warefare system 98. An output from the computer 92 is also fed to the navigation system 88, to provide control to the ship's speed and direction. Control signals are fed from computer 92 via channels 100 to the various portions of the system to perform control functions. For instance, the computer 92 controls the rate at which the acoustic source 20 is energized. Additionally, the computer 92 controls the switching operation provided by the switching device 80.

Acoustic interfaces or reflecting horizons in a water mass vary in depth from only a few hundred feet or less up to 20,000 or 30,000 feet. To achieve the required accuracy for the present system over this wide range of depths, a detector hydrophone system must operate with a nonuniform source-to-detector spacing. An example of such spacing is illustrated in the following table.

TABLE 1

| Depth to Acoustic Interface (Feet) | Distances Source to Hydrophones (Feet) | | | | | | |
|---|---|---|---|---|---|---|---|
| 80–160 | 40 | 80 | 120 | | | | |
| 160–320 | 40 | 80 | 120 | 240 | 360 | | |
| 320–640 | 40 | 120 | 240 | 360 | 480 | 720 | |
| 640–1280 | 40 | 240 | 360 | 480 | 720 | 1080 | |
| 1280–2560 | 40 | 240 | 480 | 720 | 1080 | 1440 | |
| 2560–5120 | 40 | 240 | 480 | 720 | 1080 | 1440 | 2160 |
| 5120–10240 | 40 | 240 | 480 | 720 | 1080 | 1440 | 2160 | 2880 |
| 10240–20480 | 40 | 240 | 480 | 720 | 1080 | 1440 | 2160 | 2880 |

From Table 1, it will be seen that data from the nearest detector hydrophone system is utilized to compute the average velocity to the shallowest acoustic interfaces, with the more remote hydrophone systems being utilized to compute the velocity to the deeper interfaces. Similarly, at the deeper distances, data from additional hydrophones is required. The switching device 80 is utilized to suitably connect up the hydrophone system under the control of computer 92 to provide the desired distance between the source and hydrophones according to the table.

In order to provide common depth point coverage, the time interval between successive impulses of the acoustic source 20 is a function of the interval between the hydrophones, the speed of the vessel 10, and the depth of the acoustic reflecting horizons. However, it is not generally possible to achieve common depth point coverage over the wide range of depths encountered at practical boat speeds. Thus, the acoustic reflections from great depths comprise a sequence of individual reflection patterns superimposed with time intervals equal to the interval between acoustic source pulses. The computer 92 detects these individual superimposed reflection patterns by cross and autocorrelations in a conventional manner.

The delay time between the reflection patterns is compared with the time between the acoustic impulses of the source 20, and the reflection patterns are then time shifted to permit superposition and stacking of these patterns in order to improve the signal-to-noise ratio. As an example, a vessel traveling at 6 knots moves approximately 10 feet per second. To arrive at the common depth point coverage for hydrophones 40 feet apart as are required to obtain the desired shallow data between 80 and 160 feet depths, the acoustic source 20 would be pulsed about every 2 seconds. However, the time required for acoustic reflection returns from 20,000 feet is approximately 8 seconds, and thus four reflection patterns would be provided at 2-second intervals. These reflection patterns are autocorrelated, time-shifted and summed by the computer 92 in the manner described.

The vessel 10 travels at an essentially constant speed, and the source 20 is pulsed at essentially uniform intervals under the control of computer 92 to permit synchronization and summing of the received signals. The time interval between the pulsing of the acoustic source 20 is chosen to permit collection of data from the shallowest acoustic interfaces. Thus, data from the more remote hydrophones for deeper interfaces will often not be recorded for each impulse of the acoustic source. The outputs of the hydrophones are thus switched under the control of computer 92.

In order to achieve the required accuracy for each of the interface depth ranges, a particular relationship exists between the desired frequency to be recorded and a depth of the acoustic interface. For example, for depths of 80–160 feet, the differential travel time, called the normal moveout, used to determine the vertical velocity in the manner previously disclosed will need to be measured with accuracy of 1/10 to 1/100 of a millisecond. At deeper depths of 1,000 feet, the normal moveout accuracy needed would be of the order of 1 to 1/10 millisecond. Thus, the frequencies required to achieve the same accuracy changes inversely with the depth of the interfaces.

To efficiently handle the recording of the data from the gain and switching device 80, the sampling rate of the system will be changed with the frequency or with depth. To achieve this, the multiplexer and converter 84 are under the control of the computer 92 in order to enable variation of the sample rate. By changing the sample rate, the number of bits that must be recorded on the storage unit 86 is maintained at an optimum which is related to the accuracy required and to the depth of the acoustic layer involved.

Under some circumstances, it is desirable to sample the data at rates higher than would ordinarily be needed by the computer 92 to achieve the operational accuracy. For instance, a high rate of sampling is desirable when it is anticipated that the data would be analyzed at a later time or for another purpose, either by the computer 92 or by shore-based computer. In such case, the data sample is stored on magnetic tape or the like in the storage 86 so that it would be available for later processing.

Whereas the present invention has been described with respect to specific embodiments thereof, it is to be understood that various changes and modifications will be suggested to one skilled in the art, and it is desired to encompass such changes and modifications as fall within the scope of the appended claims.

What is claimed is:

1. A system for determining the acoustic velocity profile of water and sediment masses comprising:
   a. means for sequentially generating acoustic waves along a marine traverse at spaced intervals sufficient to provide common depth point coverage of reflecting horizons, the generation of said acoustic waves being controlled by a digital computer,
   b. hydrophone means for receiving at a plurality of locations reflections from said acoustic waves to produce signals, said signals being selectively sampled by a digital computer such that signals from selected horizons can be examined,
   c. means for cross-correlating selected ones of said signals where acoustic velocity is the correlation variable,
   d. means responsive to said cross-correlation for producing a composite velocity correlation function the peak positive points of which provide indications of the average velocities of said acoustic waves in the water and sediment masses through which said acoustic waves have traveled, and
   e. means responsive to said average velocities to determine the average sectional acoustic velocity profile of selected portions of said water and sediment masses.

2. The system of claim 5 and further comprising:
   a marine vessel streaming a plurality of hydrophones for reception of said reflections.

3. The system of claim 5 and further comprising:
   means for switching between selected ones of said hydrophones for reception of reflections from different selected depths.

4. The system of claim 1 wherein said signals are sampled digitally and said cross-correlation is accomplished digitally, the rate of said sampling being varied in dependence upon the depth of the underwater reflecting horizons being examined.

5. A method of profiling the acoustic velocity of underwater masses comprising:
   a. sequentially generating acoustic waves along a marine traverse at spaced intervals sufficient to provide common depth point coverage of underwater reflecting horizons,
   b. receiving common depth point reflections from said acoustic waves to produce signals,
   c. digitally sampling said signals in dependence upon the underwater depth desired to be examined,
   d. cross-correlating ones of said signals where acoustic velocity is the correlation variable,
   e. producing from said cross-correlation composite velocity correlation functions the peak positive points of which provide indications of the average velocities of said acoustic waves in the water masses through which said acoustic waves have traveled, and
   f. operating on selected ones of said average velocities to determine the average sectional velocity of the intervals between selected underwater reflecting horizons.

6. The method of claim 5 further including signal gates which are related to one another in dependence upon the horizontal spacing between the points of reception of said reflections.

7. The method of claim 5 wherein said step of operating on comprises:
   dividing the depth interval of reflecting horizons by the travel time of an acoustic wave through said depth interval.

* * * * *